Patented Nov. 29, 1938

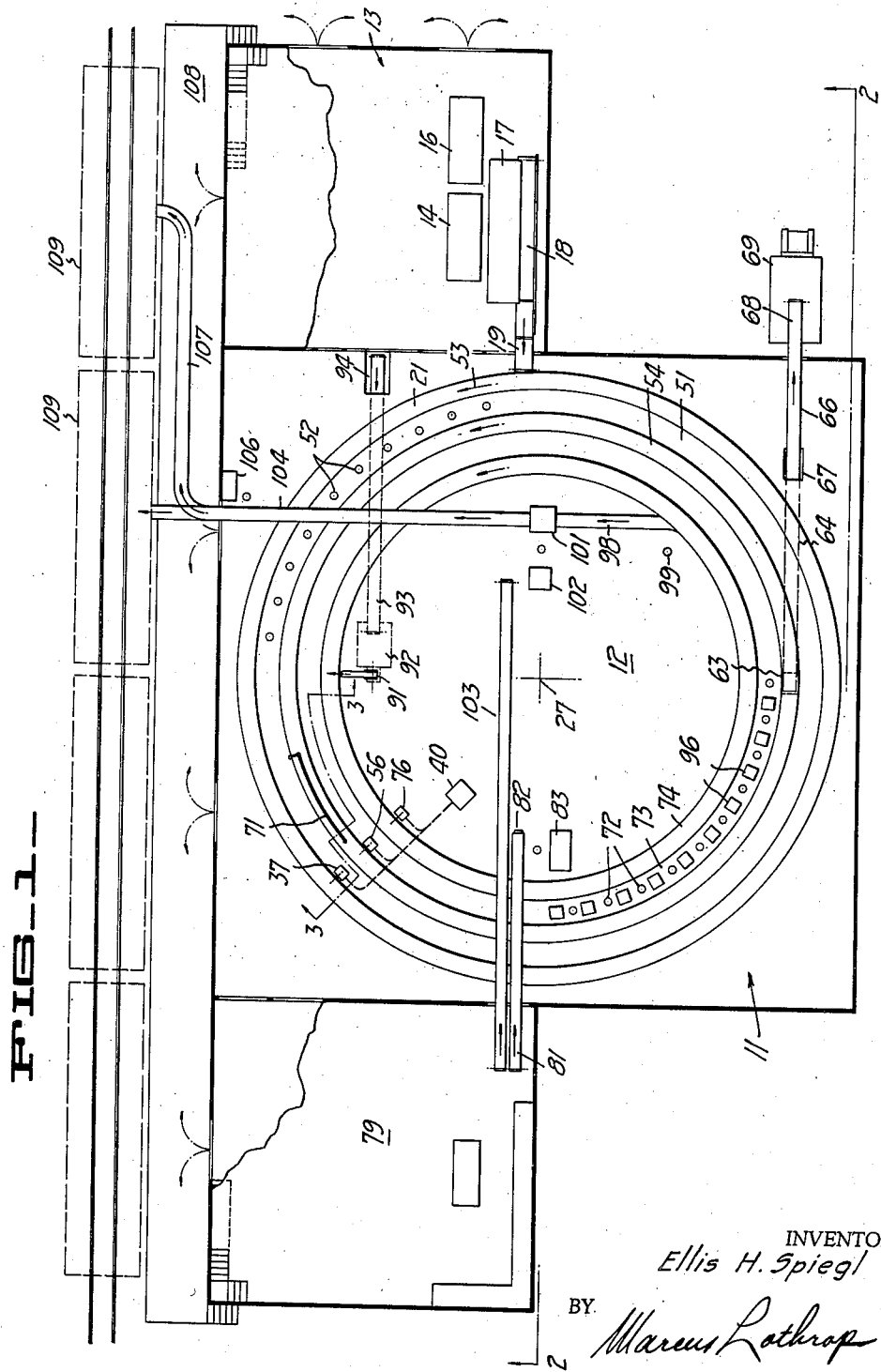

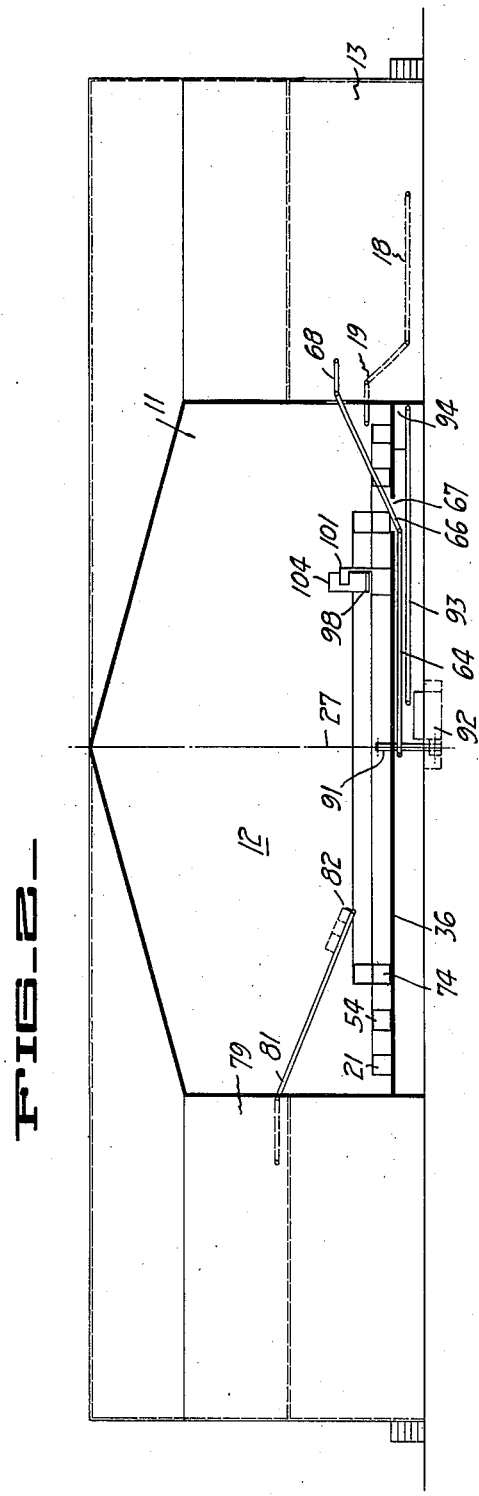
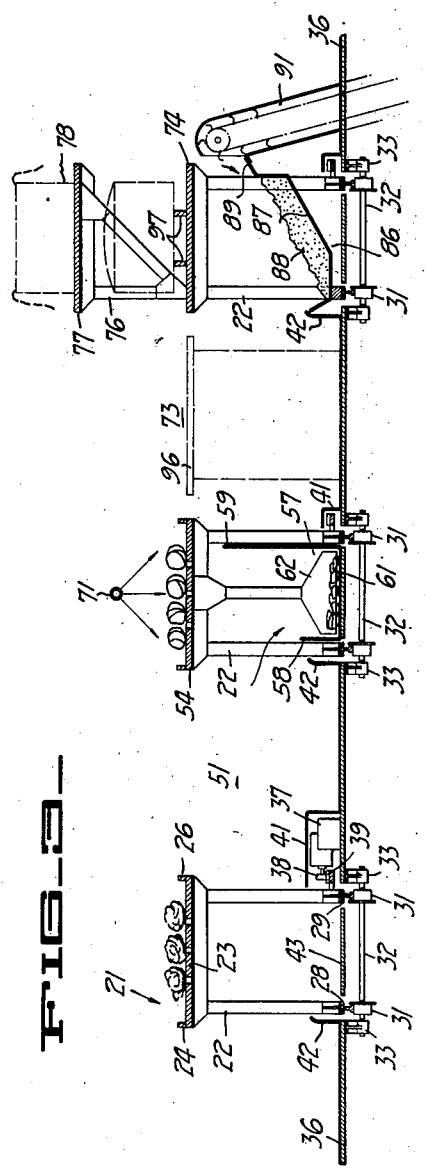

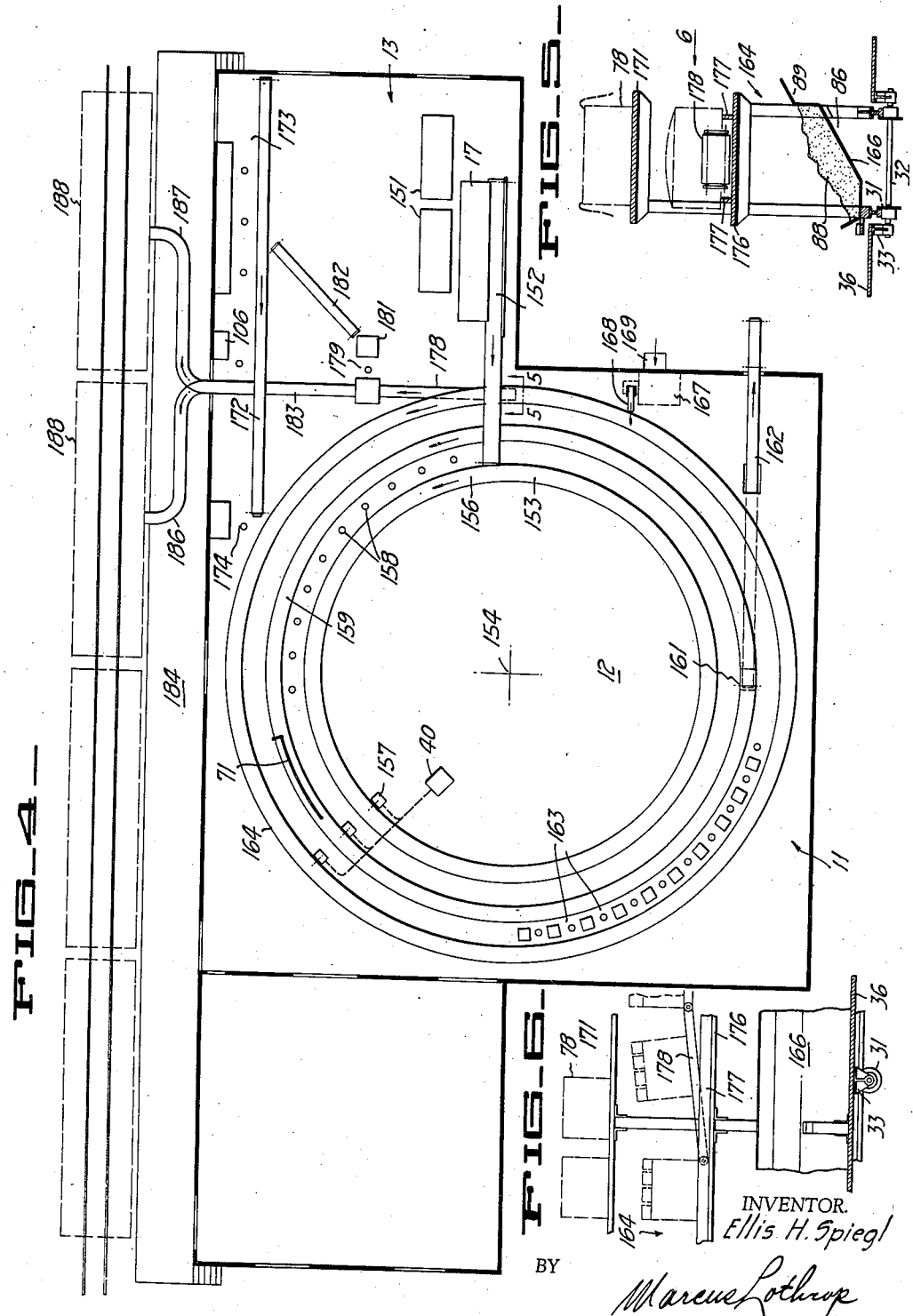

2,138,285

UNITED STATES PATENT OFFICE 2,138,285

PRODUCE-HANDLING APPARATUS

Ellis H. Spiegl, Salinas, Calif.

Application May 14, 1935, Serial No. 21,318

1 Claim. (Cl. 198—19)

My invention relates to a manner of handling produce, which is especially applicable to the expeditious and efficient handling of perishable produce such, for instance, as lettuce, in very large quantities.

Produce is, by its nature, not susceptible to complete handling by machinery, and for that reason a large amount of manual labor must be expended not only in the growing and harvesting of the crop but more particularly in its treatment and packing for market. The amount of hand labor requisite varies, depending somewhat upon the locality and the type of material being considered, but it is under any circumstances advisable to reduce as much as possible the hand labor involved. While lettuce is a product which is universally consumed, it is grown only in a few localities, so that it is important that as soon as available large quantities of it be quickly dispatched to the divers consumers.

It is therefore an object of my invention to provide an apparatus for handling large quantities of produce in a short space of time and with an economical expenditure of manual labor.

Another object of my invention is to provide a means for handling the produce gently, in order to preclude damage, but at the same time expeditiously and in large amounts.

A further object of my invention is to provide produce-handling apparatus in which the produce supplied to the workers for treatment will correspond to their capacity for treating such produce.

Another object of my invention is to provide apparatus which will handle a large quantity of produce but which is compactly arranged for economical, centralized operation.

The foregoing and other objects are attained by the embodiments of the invention shown in the drawings, in which—

Fig. 1 is a plan of a produce packing and shipping house constructed in accordance with my invention.

Fig. 2 is a cross-section the planes of which are indicated by the lines 2—2 of Fig. 1.

Fig. 3 is a cross-section the planes of which are indicated by the lines 3—3 of Fig. 1.

Fig. 4 is a plan, similar to Fig. 1, but showing a modified form of produce-handling house in accordance with my invention.

Fig. 5 is a cross-section the plane of which is indicated by the line 5—5 of Fig. 4.

Fig. 6 is a fragmentary side elevation in the direction of the arrow 6 of Fig. 5.

In its preferred form, the produce-handling apparatus of my invention includes a plurality of concentric, annular work tables, arranged with a work space therebetween within which work stations are established and to which produce is conveyed for treatment and from which produce is carried away after treatment. The method includes the steps of conveying produce a plurality of times past a work station, and then treating the produce at the work station, subsequent to which the treated produce is conveyed a plurality of times past a successive work station at which the treated and conveyed produce is discharged.

While I have chosen to describe the apparatus of my invention especially in connection with the handling and treatment of lettuce, it is of course applicable to the treatment of various other articles of produce, as well as other articles of commerce, and it is to be understood that lettuce is utilized herein solely as an example.

The apparatus is preferably housed in a packing house 11 having a main work room 12 and a receiving room 13. Produce which is received from the field is customarily conveyed to the receiving room 13 in vehicles 14 and 16, such as a truck and a trailer. The lettuce in such vehicles is removed therefrom by dumping into a chute 17 which discharges onto a conveyor 18. This conveyor is of any suitable type, such as a belt, and extends preferably along one side of the receiving room 13 in a generally horizontal plane, as especially shown in Fig. 2, and then is provided with an inclined portion 19 which discharges the lettuce onto a work table 21.

The work table 21 is located in the work room 12 and, in accordance with my invention, is preferably a circular or annular structure substantially occupying the major portion of such room. The work table itself is composed of an annular framework 22 of metal shapes, the upper surface of which is preferably covered with slats of wood or suitable material to provide a level platform 23, the edges of which are bounded by rimming pieces 24 and 26. Preferably, the entire table 21 is rotatable about a central axis 27, to which end the framework 22 is preferably provided with light rails 28 and 29 formed in circular contour and running on a plurality of wheels 31 carried by shafts 32 disposed in journals 33 mounted on the framework of the building. The floor 36 of the building is substantially at the level of the rails 28 and 29, so that the rollers 31 and their appurtenances can be disposed below the floor, out of the way of the packing operation but readily accessible for lubrication and service.

The table 21 is rotated preferably by means of an independent source of power, such as an electric motor 37, which carries a pinion 38 meshing with an annular rack 39 fastened to the framework 22. The motor 37 is connected to a controller 40, so that its speed and, correspondingly, the rate of rotation of the table 21 can be regulated to a nicety. Guards 41 and 42 protect the moving framework 22 and preclude discharge of refuse from above the floor into the space below, whereas a plate 43 preferably extends between the uprights on the framework to serve as a continuation of the floor 36.

Lettuce which is discharged by the conveyor 19 is received on the platform 23 of the table 21 and begins a circuit from such point around the entire work room 12 and then back to its point of origin. Unless otherwise treated, such lettuce will continue to circulate indefinitely, and the conveyor 18 can be operated in such relationship to the speed of rotation of the table 21 that a substantially uniform layer of lettuce is established and maintained on the platform 23.

The reason for providing a substantially uniform layer of lettuce on the conveyor 21 is so that there will always be available to workmen a steady supply of the produce for further treatment. That is to say, it is not necessary to regulate the speed of the conveyor 21 exactly to correspond with the rate of handling of the produce by the workmen, for if there should be an excessive amount of lettuce supplied, such excess simply continues to travel repeatedly throughout the circuit until such time as it is handled or removed. If there is a dearth of produce supplied, then it is necessary that controller 40 be regulated to increase the speed of the table so that an additional amount of produce will be supplied to the workmen.

In accordance with my invention, I preferably provide a work space 51 or aisle within the circle of the table 21, for a crew of workers called "trimmers". Each trimmer is established at a work station 52, at which he faces the direction of approach of the work table 21, or facing the arrow 53 in Fig. 1. Each trimmer removes a head of lettuce from the platform 23, strips it of its outer and damaged leaves, and deposits such stripped or trimmed head of lettuce on a work table 54, and continues the operation. The second work table 54 is in most respects identical in construction with the table 21 and is arranged coaxially therewith for rotation about the center 27 and is separated therefrom by the work space 51. The work table 54 is driven by a suitable motor 56 which is separately operated from the controller 40, so that the relative speed between the tables 21 and 54 can be governed as desired.

In addition to those parts of the table 54 which are similar to the table 21, there is provided underneath the table 54 a trough 57 which preferably is of metal and is provided with an outer, low side 58 and an inner, high side 59. The bottom 61 of the trough is preferably supported from below between the shafts 32 and is relatively smooth. Since the framework 22 of the table 54 is of open construction, access to the trough 57 is readily obtained from the work space 51, so that the outer lettuce leaves, which are stripped by the trimmers at the stations 52, are discarded into the trough 57 at the same time that the stripped or trimmed head is placed upon the table 54 by a workman.

In order that the discarded leaves or "culls" will not accumulate unduly, I preferably provide under the table 54 a conveyor for carrying away the culls. This can be of a standard type, such as a belt conveyor, or can be of the form shown in which a plurality of paddles 62 are fastened to the framework 22 of the table 54 at appropriate intervals and loosely interfit with the trough 57. Since these paddles revolve with the table 54, they push the culls ahead of them until such time as the culls fall through an aperture 63 in the bottom 61 of the trough and in the floor 36. Situated just below such aperture is a cull conveyor 64, which receives such discarded leaves and carries them below the floor in a generally horizontal direction and finally on an incline 66, through an opening 67 in the floor to an elevated position 68, from which they are discharged into a waiting vehicle 69 which is emptied periodically. Some of the heads of lettuce which are taken from the table 21 are not of the proper quality to be trimmed and placed on the table 54, so they are thrown into the trough 57 for conveyance to the cull dump vehicle 69. This results in a different number of heads of lettuce being present for subsequent treatment on the table 54 than are removed from the table 21, so that a slight difference in speed of rotation of the two tables may be desirable. This reason is augmented by the facts that the linear dimensions of the two tables necessarily are different and that a different number of workers may be stationed at each table.

Those heads of lettuce which are placed on the table 54, preferably at a point in their circuit just behind the last of the trimmers 52, pass under a spray apparatus 71 which washes the heads preferably with a cold water spray. The dirt and debris removed thereby pass through the apertures or openings between slats in the platform 54 and are carried away in any suitable fashion. The heads of lettuce so treated are then ready for packing, and in their circuit next come into juxtaposition with a plurality of packers, each located at a packing station 72 disposed within the circumference of the table 54 in a work space 73 defined by such table and an inner table 74.

This inner table 74 is constructed, in general, in the same manner as the previously described tables and revolves substantially in synchronism therewith since it is driven by a motor 76 controlled by the controller 40 at any desired speed of rotation about the common axis 27. This annular table, instead of being no higher than the general horizontal plane of the remaining tables, is preferably provided with a superstructure 76 carrying a rack 77 for the reception of empty lettuce crates 78. These crates are preferably assembled in a shook room 79 from which they are discharged on a roller conveyor 81 and pass over the three tables 21, 54 and 74 to a station 82 at which a workman lines each of the crates with paper at an apparatus 83 and places the lined but otherwise empty crate on the rack 77, so that the rack is adequately supplied with empty, lined crates at all times. In addition to the table 74 and the rack 77, the framework preferably carries an ice bin 86, which is somewhat similar to the trough 57 but which, unlike the trough, advances with the table. A sloping bottom 87 is provided on the ice bin, so that the natural angle of repose of the crushed ice 88 therein will afford a substantially uniform thickness of ice and preclude deep ice pockets wherein refreezing can occur.

The ice is supplied over an annular flange 89 of the bin 86 by a crushed ice conveyor 91 which extends up through the floor 36 from an ice crusher 92 located below the floor and receiving blocks of ice from a conveyor 93 extending beneath the tables 21, 54 and 74 from an ice delivery chute 94 accessible to a truck in the receiving room 13. The bin 86 is filled with a predetermined charge of crushed ice at all times. The packers at the stations 72, with the described arrangement, have to their left hands a continually approaching supply of trimmed lettuce heads on the table 54, and to their right hands a continuous supply of lined, empty crates on the rack 77 and a continuous supply of crushed ice in the bin 86. Each packer therefore takes a crate 78 from the rack 77 and places it on his packing stand 96 at his station. He then packs the crate with stripped and sprayed and selected heads from the table 54, and intersperses the pack with crushed ice which he takes with a scoop from the bin 86.

The packed and iced crate is then removed by the packer from his stand 96 and is disposed on a pair of rails 97 upstanding from the table 74. The filled and partially iced crates proceed around any necessary portion of the circuit until such time as they come to a conveyor 98, onto which they travel, being assisted if necessary by an operator at a switching station 99, who, in addition to superintending the travel of the filled crates, places in the crates any additional crushed ice which may be necessary, taking his supply from the bin 86. The crates travel on the conveyor 98 to a nailing machine 101, at which lids taken from a supply 102 are fastened thereon. The supply is maintained by lids received from the shook room 79 on a conveyor 103 which passes over the tables 21, 54 and 74.

From the nailing machine 101 the filled, iced and closed crates are carried by a conveyor 104 upwardly over the series of annular tables, and finally pass a labelling station 106 and out onto a conveyor 107 on a loading platform 108 from which they proceed into cars 109 stationed thereat.

As an alternative arrangement, there is disclosed in Figs. 4, 5 and 6 a building of the same general characteristics and equipment as that shown in Figs. 1, 2 and 3, but in which the order of the tables is reversed. That is to say, lettuce which is received from the trucks 151 on a conveyor 152 is discharged onto the innermost table 153 of a concentric series of tables all revolving about an axis 154. The table 153 is revolved in the direction of the arrow 156 by a driving motor 157, so that the produce thereon can be removed and trimmed by trimmers at stations 158. The trimmers discharge their culls into the lower part of a concentric table 159, from which the culls pass through an aperture 161 and are carried away by a cull conveyor 162. The trimmed heads, however, are carried on the upper platform of the table 159 to a plurality of packers at stations 163, who remove the heads from the table 159 and place them in paper-lined crates together with crushed ice. An outer table 164 is constructed in three tiers, the lower one 166 containing the crushed ice received from an ice-crusher 167 discharging thereinto by means of a conveyor 168 and receiving ice from a chute 169. The upper tier of the table 164 is in the form of a rack 171 for the reception of empty crates from a conveyor 172 extending from a shook room 173. The crates are sent along such conveyor to a paper-lining station 174, from whence they are placed on the platform 171 and follow the circuit with the table 164. The packers at stations 163 are therefore continuously supplied with lined crates and with crushed ice, so that they can assemble the trimmed heads and the crushed ice in the lined crates.

The filled and packed crates are placed by the packers on the intermediate tier 176 of the table, resting upon sills 177, so that the bottom of each crate is spaced above the table. The filled crates then progress to an elevating conveyor 178, which overlies the platform 176 and extends between the sills 177, so that the crates travelling thereto ride upon such conveyor and are lifted thereby from the sills 177 and are conveyed tangentially away from the table 154 to a nailing station 179. Lids are carried to a station 181 by a conveyor 182 from the box department, and the lids are assembled on the crates at the nailing station. The closed crates are conducted by a roller conveyor 183 underneath the empty-crate conveyor 172 to the loading platform 184, at which they are dispersed on branch conveyors 186 and 187 to refrigerator cars 188.

In accordance with the various objects of my invention, the lettuce or other produce is handled with a minimum of manual labor and in very large quantities. Since the method employed contemplates passing the produce a plurality of times past an operating station, the operator at such station can remove the produce from the conveyor at any desired rate, and any excess will simply follow the circuit until removed. There is no necessity for precise and close regulation of the speed of operation of the various instrumentalities, and the method, therefore, is extraordinarily flexible and self-regulating to comply with the rate at which the produce is received, so that the produce can be discharged in substantially the desired manner.

I claim:

Produce-handling apparatus comprising a table including a rotating framework forming an annulus, a horizontal annular platform on said framework, an annular bin on said framework below said platform, an annular rack on said framework above said platform, means for supplying said rack and said bin during rotation thereof with materials which when combined are carried by said platform, and means for removing said combined materials from said platform.

ELLIS H. SPIEGL.